US011294720B2

(12) United States Patent
Zeng

(10) Patent No.: US 11,294,720 B2
(45) Date of Patent: Apr. 5, 2022

(54) CMA MEMORY ALLOCATION METHOD BASED ON SCREENING MARKS

(71) Applicant: AMLOGIC (SHANGHAI) CO., LTD., Shanghai (CN)

(72) Inventor: Tao Zeng, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 572 days.

(21) Appl. No.: 16/325,119

(22) PCT Filed: Sep. 27, 2018

(86) PCT No.: PCT/CN2018/108100
§ 371 (c)(1),
(2) Date: Feb. 12, 2019

(87) PCT Pub. No.: WO2019/072094
PCT Pub. Date: Apr. 18, 2019

(65) Prior Publication Data
US 2021/0334140 A1 Oct. 28, 2021

(30) Foreign Application Priority Data
Oct. 11, 2017 (CN) .......................... 201710943280.3

(51) Int. Cl.
*G06F 9/50* (2006.01)
*G06F 12/02* (2006.01)

(52) U.S. Cl.
CPC .......... *G06F 9/5016* (2013.01); *G06F 9/5022* (2013.01); *G06F 12/023* (2013.01); *G06F 2209/508* (2013.01)

(58) Field of Classification Search
None
See application file for complete search history.

(56) References Cited

U.S. PATENT DOCUMENTS 7,516,291 B2 * 4/2009 van Riel ............... G06F 12/023
711/170
7,523,284 B1 * 4/2009 Wilson .................. G06F 9/5016
711/156

(Continued)

FOREIGN PATENT DOCUMENTS

CN 102053916 A 5/2011
CN 102156675 A 8/2011
(Continued)

OTHER PUBLICATIONS

Park et al. "GCMA: Guaranteed Contiguous Memory Allocator", 2016, pp. 29-34.*

*Primary Examiner* — Van H Nguyen
(74) *Attorney, Agent, or Firm* — Talem IP Law, LLP

(57) ABSTRACT

A memory/multi-core concurrent memory allocation method, which is applied to an embedded system, wherein a kernel module and a plurality of application programs are provided. The memory allocation method comprises: acquiring first memory allocation requests of the plurality of application programs; the kernel module determining whether preset screening marks exist in the first memory allocation requests; when screening marks exist in the first memory allocation requests, prohibiting allocating memory for the current application program managed by a contiguous memory allocator. By adopting the memory allocation method, the application programs which occupy contiguous memory allocated by the continuous memory allocator for a long time can be screened and removed, then contiguous memory allocation can be provided for the drivers in a shorter time, and the corresponding contiguous continuous memory can be allocated for the drivers through a plurality of processing units at the same time with a higher efficiency.

7 Claims, 3 Drawing Sheets

(56) References Cited

U.S. PATENT DOCUMENTS

| | | | | |
|---|---|---|---|---|
| 7,814,288 B2* | 10/2010 | Coon | ................ | G06F 12/1416 |
| | | | | 711/163 |
| 7,937,625 B2* | 5/2011 | Calinoiu | ............... | G06F 12/023 |
| | | | | 714/38.1 |
| 8,402,249 B1 | 3/2013 | Zhu et al. | | |
| 8,838,928 B2* | 9/2014 | Robin | ................ | G06F 12/023 |
| | | | | 711/170 |
| 8,954,707 B2* | 2/2015 | Gheith | ................ | G06F 12/023 |
| | | | | 711/202 |
| 10,019,288 B2* | 7/2018 | Kung | ..................... | G06F 12/02 |
| 10,795,808 B2* | 10/2020 | Naccache | ............ | G06F 21/566 |
| 2007/0118712 A1* | 5/2007 | van Riel | ................ | G06F 12/12 |
| | | | | 711/170 |
| 2018/0074863 A1* | 3/2018 | Kung | .................. | G06F 3/0662 |
| 2018/0373624 A1* | 12/2018 | Naccache | ............ | G06F 12/023 |

FOREIGN PATENT DOCUMENTS

| | | |
|---|---|---|
| CN | 102521184 A | 6/2012 |
| CN | 107220189 A | 9/2017 |

* cited by examiner

CMA MEMORY ALLOCATION METHOD BASED ON SCREENING MARKS

CROSS-REFERENCE TO RELATED APPLICATIONS

The present application is the U.S. National Stage Application of International Application No. PCT/CN2018/108100, filed Sep. 27, 2018, which claims priority to and the benefit of Chinese Application Serial No. 201710943280.3, filed Oct. 11, 2017.

BACKGROUND OF THE INVENTION

1. Field of the Invention

The invention relates to the field of communication technology, and more particularly to, a memory allocation method and a multi-core concurrent memory allocation method.

2. Description of the Related Art

With the progress of audio and video encoding and decoding technologies, on the embedded platform, lots of contiguous memory should be reserved for accommodation of GPU, Camera and HDMI, etc. The reserved memory is unavailable for other application programs. However, the memory must be reserved in advance. Since resources cannot be fully utilized due to the waste of the reserved memory, memory is no longer reserved simply by using CMA (Contiguous Memory Allocator). In particular, the memory is available for other application programs when not being occupied by Camera, HDMI and other devices. At present, CMA has become the best solution for driving to use lots of memory on the embedded platform. The CMA can share the memory to the application programs when the driver does not use the memory through the specially marked migration type, and can compile enough contiguous memory for the driver by using the kernel's memory recovery and migration mechanism when the memory is required for the driver. The application programs and the drivers' need for the memory is well balanced, and it greatly alleviates the negative effects of being not smooth when it is out of memory. However, the above-mentioned solution has following shortcomings. Specifically, in the case when the memory usage is high and the memory is shared to the application program by CMA, data provided by the application program may be provided to the driver layer of the block device for processing, such that the driver has to wait for a longer time when the contiguous memory is allocated by CMA. In addition, when CMA shares the memory to the application program, if current application program needs to perform a great amount of input and output operations, it may takes longer time for CMA to allocate the contiguous memory for the driver.

SUMMARY OF THE INVENTION

In order to solve the above-mentioned problem occurring in the prior art in CMA allocating contiguous memory for the driver, and to remove application programs which occupy contiguous memory allocated by the continuous memory allocator for a long time, the present invention provides a memory allocation method and a multi-core concurrent memory allocation method for the drivers which can be implemented in a shorter time by CMA.

Detailed technical solutions are as follows:

A memory allocation method, applied to an embedded system, wherein a kernel module and a plurality of application programs are provided; wherein the memory allocation method comprises steps of:

Step S1, acquiring first memory allocation requests of the plurality of application programs;

Step S2, the kernel module determining whether preset screening marks exist in the first memory allocation requests;

Step S3, when screening marks exist in the first memory allocation requests, prohibiting allocating memory for the current application program managed by a contiguous memory allocator.

Preferably, the screening marks comprise:

a first mark, configured to indicate that the plurality of application devices provide data to block devices for processing;

a second mark, configured to represent a write operation performed by one of the plurality of application programs.

Preferably, the memory allocation request is a mark set, and the mark set is configured to specify marks for the memory allocation and a behavior for control of the memory allocation.

Preferably, the memory allocation method further comprises a plurality of drivers, when the kernel module acquires second memory allocation requests of the driver modules, performs steps of:

Step A1, determining whether the contiguous memory allocated by the contiguous memory allocator being occupied by other application programs;

if the result shows "YES", turning to Step A2;

if the result shows "NO", turning to Step A3;

Step A2, migrating the plurality of application programs from the contiguous memory to a newly-allocated memory; and Step A3, allocating the contiguous memory for the driver modules by the kernel module according to the memory allocation requests of the driver modules.

The present invention further provides a multi-core concurrent memory allocation method comprising the above-mentioned memory allocation method the multi-core concurrent memory allocation method specifically comprises steps of:

M processing units being provided in the embedded system, when the second memory allocation requests sent by the driver module are received, performing steps of:

Step B1, acquiring the quantity of contiguous memory that needs to be allocated according to the second memory allocation requests;

Step B2, dividing the quantity of the contiguous memory allocated into N parts;

Step B3, sending the second memory allocation requests to each of the processing units; and Step B4, allocating the quantity of the contiguous memory corresponding to each of the N parts by the each of the processing units according to the second memory allocation requests.

Preferably, M=N.

Preferably, M=4, N=4.

The above-mentioned technical solutions have the following beneficial effects. By adopting the memory allocation method, the application programs which occupy contiguous memory allocated by the continuous memory allocator for a long time can be screened and removed, then contiguous memory allocation can be provided for the drivers in a shorter time, and on the other hand, the corresponding contiguous continuous memory can be allocated for the drivers through a plurality of processing units at the same time so that the allocation efficiency can be higher.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

The technical solutions set forth in the present invention comprise a memory allocation method.

Figure 1:
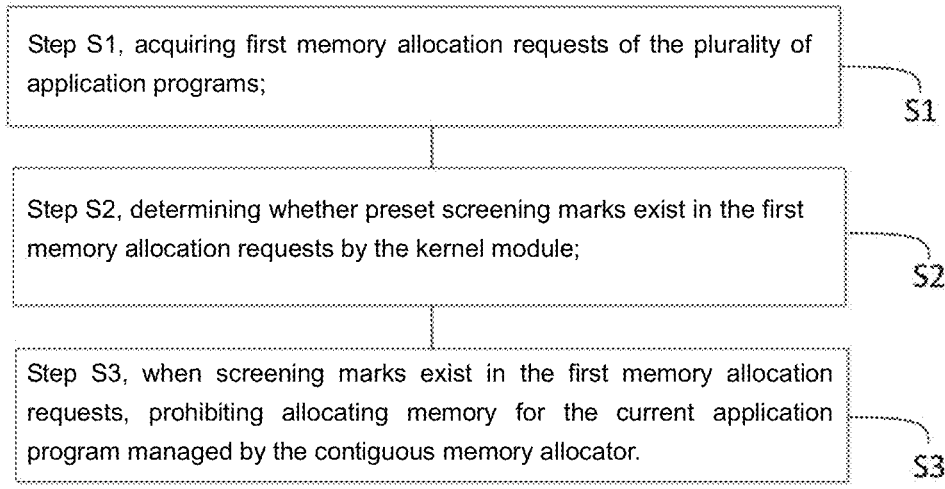
FIG. 1 is a flowchart of a memory allocation method according to an embodiment of the present invention.

An embodiment of a memory allocation method, applied to an embedded system, wherein in the method, a kernel module and a plurality of application programs are provided; as shown in FIG. 1, the memory allocation method comprises the steps of:

Step S1, acquiring first memory allocation requests of the plurality of application programs;

Step S2, the kernel module determining whether preset screening marks exist in the first memory allocation requests;

Step S3, when screening marks exist in the first memory allocation requests, prohibiting allocating memory for the current application program managed by a contiguous memory allocator. However, other types of memories can be allocated to the current application program.

In the prior art, for the application programs which occupy contiguous memory allocated by CMA for a long time, such as the application programs that needs to perform a large number of input and output operations, and the application programs whose data needs to be processed by the driver layer of the block device, if the contiguous memory is needed to be allocated for the drivers when these application programs have occupied the contiguous memory allocated by CMA, some problems will occur. Since the application programs are occupying the contiguous memory allocated by CMA, and migration cannot be immediately performed on the application programs due to the fact that immediate migration operation will make an error occur in the application programs, the common practice is to wait for the application programs to complete its operation, then CMA allocates the corresponding contiguous memory for the drivers. In this case, CMA may needs to wait for a relatively long time, and direct impact may be embodied the following ways, such as some delay in the decoding process, thus, a users' experience is lowered.

In the present invention, the application programs which occupy contiguous memory allocated by the continuous memory allocator for a long time can be screened and removed. It should be noted that screening and removing herein do not means that the application program is not executed. It means that the application program will use the memory allocated in other ways rather than the contiguous memory allocated by the CMA. The benefit effect of this operation is that the CMA can quickly perform the allocation operation without taking a long wait time when it is necessary to allocate contiguous memory to the driver.

In a preferred embodiment, the screening marks comprise:

a first mark, which may be GFP_BDEV mark and is configured to indicate that the plurality of application devices provide data to block devices for processing;

a second mark, which may be GFP_WRITE mark and is configured to represent a write operation performed by one of the plurality of application programs.

In a preferred embodiment, the memory allocation request is a mark set, and the mark set may be a gfp_mask parameter configured to specify marks for the memory allocation and a behavior for control of the memory allocation.

In the above-mentioned technical solutions, when the kernel module receives the first memory allocation requests from the application program, first of all, judging whether preset screening marks (i.e. the GFP_BDEV mark or the GFP_WRITE mark) are included in the gfp_mask parameter. If the preset screening marks exist in the gfp_mask parameter, it shows that the current application program will occupy the contiguous memory allocated by the CMA for a long time.

It should be noted that an allocation mark parameter, which referred to as gfp_mask, must be provided when the memory is allocated to any application programs and the drivers;

The gfp_mask may comprise one or more of GFP_BDEV mark/GFP_WRITE mark or GFP_FS/GFP_IO mark.

Figure 2:
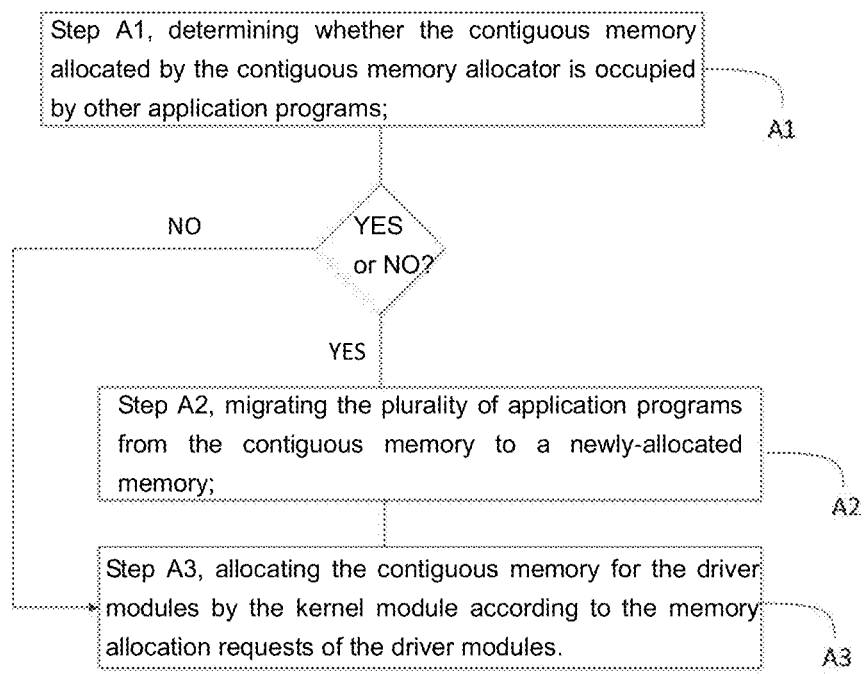
FIG. 2 is a flowchart of an application program migration in a memory allocation method according to an embodiment of the present invention.

In a preferred embodiment, the memory allocation method further comprises a plurality of drivers, as shown in FIG. 2, when the kernel module acquires second memory allocation requests of the driver modules, performing the steps of:

Step A1, determining whether the contiguous memory allocated by the contiguous memory allocator being occupied by other application programs;
if the result shows "YES", turning to Step A2;
if the result shows "NO", turning to Step A3;
Step A2, migrating the plurality of application programs from the contiguous memory to a newly-allocated memory; and
Step A3, allocating the contiguous memory for the driver modules by the kernel module according to the memory allocation requests of the driver modules.

In the above-mentioned technical solutions, the method for migrating the application program from the current contiguous memory allocated by the CMA to a newly-allocated memory can be performed by a corresponding migration mechanism.

Figure 3:
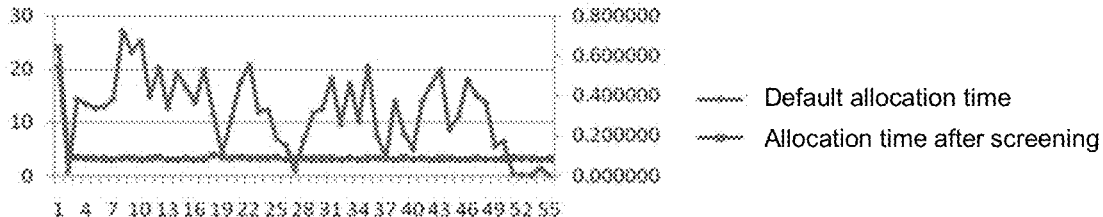
FIG. 3 is a line graph showing a comparison between a conventional default CMA allocation method and a distribution method provided in the present invention in a memory allocation method according to an embodiment of the present invention.

As shown in FIG. 3, the left vertical axis represents the existing default allocation mode, and the right vertical axis is the allocation mode in the present invention. As can be seen from the figure, when the default allocation program has a large number of file operations, it takes 2 seconds to 30 seconds for the memory of about 200 M to be allocated in the existing allocation mode, and the allocation method of the present invention can reduce the allocation time of the CMA to 600 ms or less under the same conditions.

The technical solutions set forth in the present invention comprise a multi-core concurrent memory allocation method.

Figure 4:
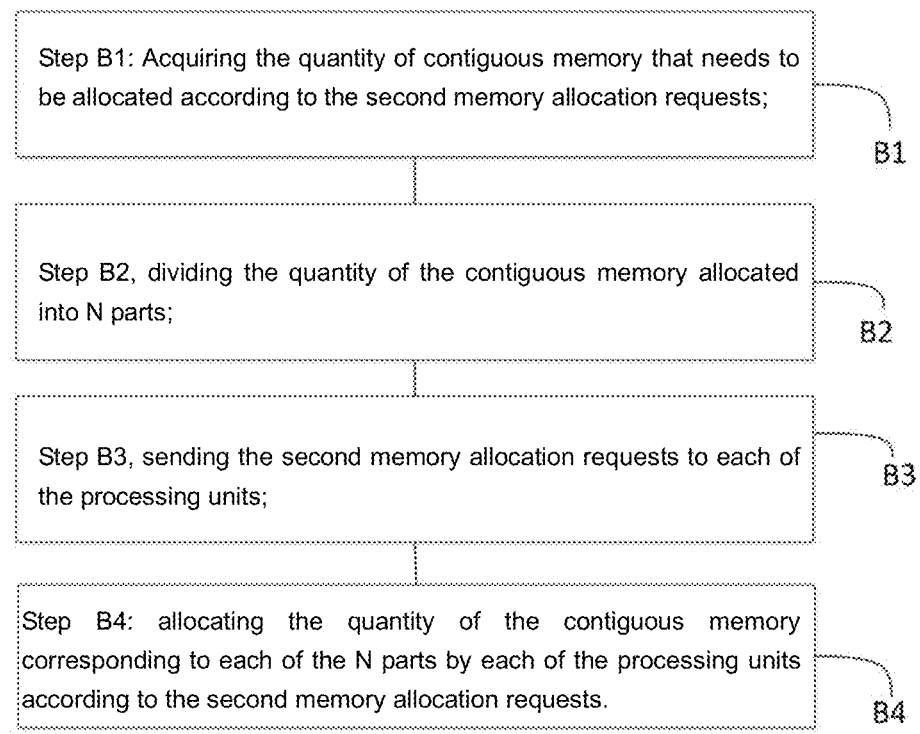
FIG. 4 is a flowchart of a multi-core concurrent memory configuration method according to an embodiment of the present invention.

In an embodiment of a multi-core concurrent memory allocation method, as shown in FIG. 4, the method comprises the above-mentioned memory allocation method, and the multi-core concurrent memory allocation method specifically comprises the steps of:

M processing units being provided in the embedded system, when the second memory allocation requests sent by the driver module are received, performing the steps of:
Step B1, acquiring the quantity of contiguous memory that needs to be allocated according to the second memory allocation requests;
Step B2, dividing the quantity of the contiguous memory allocated into N parts;
Step B3, sending the second memory allocation requests to each of the processing units; and
Step B4, allocating the quantity of the contiguous memory corresponding to each of the N parts by the each of the processing units according to the second memory allocation requests.

In a preferred embodiment, M=N.
In a preferred embodiment, M=4, N=4.

In the above-mentioned technical solutions, a specific embodiment is shown for illustration. For example, when the number of the processing unit is 4, and the size of the contiguous memory needs to be allocated to the driver is 500 M, it is preferable that the size of the memory is divided into 4 equal parts, that is to say, 125 M for each part. When each of the processing units receives the second memory allocation request, the contiguous memory of 125 M is allocated to each of the processing units at the same time, such that the contiguous memory of 500 M can be provided to the driver. In addition, simultaneous execution of the CPU allows the CMA to complete the allocation of contiguous memory faster.

Figure 5:
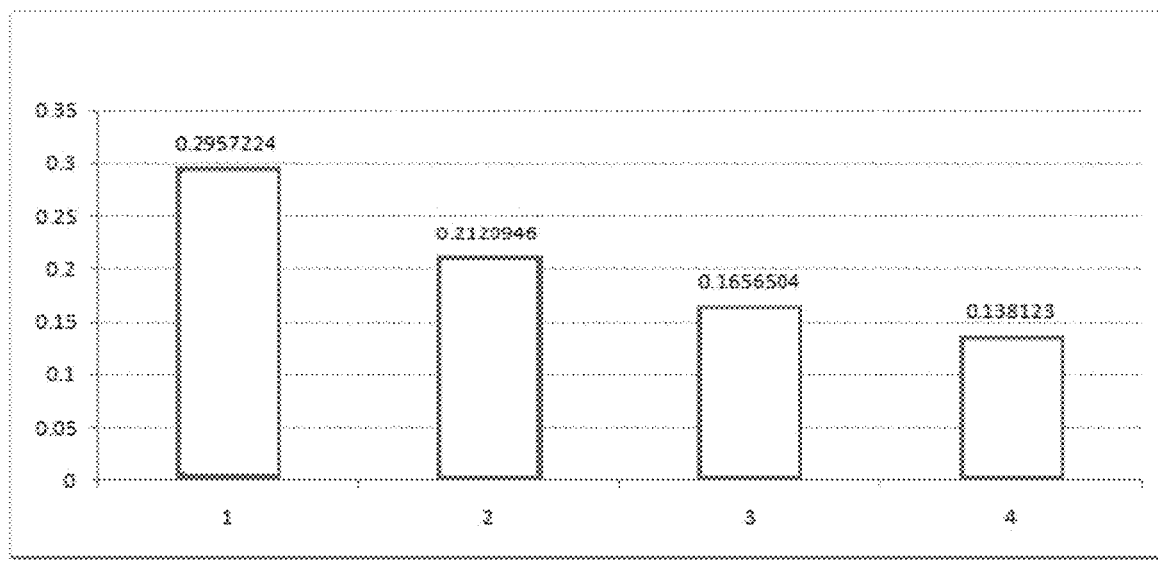
FIG. 5 is a bar graph of the time required for different numbers of processing units to perform memory allocation in a multi-core concurrent memory configuration method according to an embodiment of the present invention.

As shown in FIG. 5, the Y axis represents the time that the CMA needs to allocate the memory, and the X axis represents the number of processing unit. By comparing different numbers of processing unit, it can be concluded that processing time of allocation is correspondingly reduced in accordance with an increase of the number of the processing unit by adopting a multi-core concurrent memory allocation method.

The above descriptions are only the preferred embodiments of the invention, not thus limiting the embodiments and scope of the invention. Those skilled in the art should be able to realize that the schemes obtained from the content of specification and drawings of the invention are within the scope of the invention.

The invention claimed is:

1. A contiguous memory allocator (CMA) memory allocation method based on screening marks, applied to an embedded system, wherein a kernel module, a plurality of drivers, and a plurality of application programs are provided in the embedded system; wherein the memory allocation method comprises steps of:

Step S1, acquiring first memory allocation requests of the plurality of application programs;
Step S2, the kernel module determining whether preset screening marks exist in the first memory allocation requests;
Step S3, when screening marks exist in the first memory allocation requests, prohibiting allocating memory for a current application program managed by a contiguous memory allocator; and
when the kernel module acquires second memory allocation requests of the drivers, performing steps of:
Step A1, determining whether the contiguous memory allocated by the contiguous memory allocator is being occupied by other application programs;
if the result shows "YES", turning to Step A2;
if the result shows "NO", turning to Step A3;
Step A2, migrating the plurality of application programs from the contiguous memory to a newly-allocated memory; and
Step A3, allocating the contiguous memory for the driver modules by the kernel module according to the memory allocation requests of the drivers.

2. The CMA memory allocation method based on screening marks as claimed in claim 1, wherein the screening marks comprise:
a first mark that indicates that the plurality of application programs provide data to block devices for processing; and
a second mark that represents a write operation performed by one of the plurality of application programs.

3. The CMA memory allocation method based on screening marks as claimed in claim 1, wherein the memory allocation request is a mark set, wherein the mark set specifies marks for the memory allocation and a behavior for control of the memory allocation.

4. The CMA memory allocation method based on screening marks as claimed in claim 1, wherein for M processing units being provided in the embedded system, when receiving the second memory allocation requests sent by the drivers, performing steps of:
   Step B1, acquiring the quantity of contiguous memory that needs to be allocated according to the second memory allocation requests;
   Step B2, dividing the quantity of the contiguous memory allocated into N parts;
   Step B3, sending the second memory allocation requests to each of the processing units; and
   Step B4, allocating the quantity of the contiguous memory corresponding to each of the N parts by the each of the processing units according to the second memory allocation requests,
wherein M is equal to N.

5. The CMA memory allocation method based on screening marks as claimed in claim 4, wherein M=4, N=4.

6. The CMA memory allocation method based on screening marks as claimed in claim 4, wherein the screening marks comprise:
   a first mark that indicates that the plurality of application programs provide data to block devices for processing; and
   a second mark that represents a write operation performed by one of the plurality of application programs.

7. The CMA memory allocation method based on screening marks as claimed in claim 4, wherein the memory allocation request is a mark set, wherein the mark set specifies marks for the memory allocation and a behavior for control of the memory allocation.

* * * * *